Patented May 5, 1953

2,637,677

UNITED STATES PATENT OFFICE 2,637,677

ARYL MERCURIC FUNGICIDE AND THE METHOD OF USING THE SAME

Robert A. Dinerstein, Park Forest, Ill., assignor to Standard Oil Company, Chicago, Ill., a corporation of Indiana No Drawing. Application January 10, 1951, Serial No. 205,427

11 Claims. (Cl. 167—30)

This invention relates to a novel organo-mercury compound having fungicidal and bactericidal properties. More particularly, the invention relates to a markedly water-soluble aromatic mercuric compound. Still more particularly, the invention relates to a liquid, highly water-soluble phenyl mercuric compound having strong surface activity and marked fungicidal properties. Also, the invention relates to a method of preventing fungus and bacterial growth in the manufacture of paper and leather.

It is well known that organo-mercury compounds and the aromatic mercuric compounds, in particular, possess excellent fungicidal and bactericidal powers. Of particular importance is the power of inhibiting the growth of lower forms of life such as fungi and bacteria, when extremely low concentrations are used. The better known of these are the phenyl mercury compounds, such as phenyl mercuric acetate, phenyl mercuric benzoate, phenyl mercuric borate, phenyl mercuric chloride, phenyl mercuric gluconate, phenyl mercuric hydroxide, phenyl mercuric nitrate, phenyl mercuric phthalate, phenyl mercuric salicylate, and phenyl mercuric oleate. The phenyl mercuric compounds are more commonly used than the inorganic mercury salts because they are less toxic to the higher forms of life. These prior aromatic mercury salts have the disadvantage of very low solubility in water. The most effective of these compounds in bactericidal and fungicidal powers are the phenyl mercuric salts of boric acid, nitric acid and acetic acid; as little as one part of the salt in 1,000,000 parts of water will inhibit the growth of some bacterial types and one part of the salt in 1,000 parts of water will kill most bacterial types. At 25° C., the solubility of these particular salts, in grams per liter is: acetate, 4.7; borate, 10.9; nitrate, 0.6.

In addition to the low water solubility, the phenyl mercuric salts have the disadvantage of being solids at normal temperatures. It is rather difficult to obtain effective concentrations under normal operating conditions in industries using these fungicides, such as the paper and leather industries. In order to increase the rate of solution, the salt is ground into a fine dust-like powder; stringent safety precautions are necessary in order to avoid poisoning as a result of breathing the powder that unavoidably gets into the atmosphere. These particular disadvantages of the commonly used phenyl mercuric salts have caused a wide search for more water-soluble compounds with good fungicidal and bactericidal powers. A liquid organo-mercury compound that is at least 20% by weight soluble in water, and preferably completely miscible, would be especially useful.

An object of this invention is to produce a liquid organo-mercury compound with good fungicidal properties and high water solubility. Still another object is to produce an aromatic mercuric compound that is liquid at ordinary temperatures, is highly water-soluble, is surface-active, and is an effective fungicide. A further object is to develop a method for preventing fungus and bacterial growth wherever moist organic material is processed, for instance, leather, paper, wood, adhesives, casein paints, and textiles.

I have found that a material with excellent fungicidal and bactericidal properties, with excellent water solubility and that is a liquid at ordinary temperatures can be made by incorporating a number of oxyalkylene groups into an aromatic nucleus and subsequently reacting with a mercuric salt. The polyoxyalkylene ether chain can be obtained by using either ethylene oxide or propylene oxide with a phenolic or naphtholic compound. Enough of these oxyalkylene groups must be added to impart the required water solubility. In addition to the mercuric salt group and the polyoxyalkylene ether chain, the aromatic nucleus may have attached thereto an alkyl group, such as methyl, octyl or octadecyl. My novel compound may be represented by the general formula:

in which Z represents a benzene or a naphthalene group, HgX is a mercury salt wherein X represents an acid radical, R represents hydrogen or an aliphatic group (saturated or unsaturated) of from 1 carbon atom to about 18 carbon atoms, A represents a polyoxyethylene ether, a polyoxypropylene ether or a mixed polyoxyethylene-propylene ether chain, containing from 4 to about 25 oxyalkylene groups. In order to confer the required degree of water solubility on the compound, the number of oxyalkylene groups will vary with the number of carbon atoms present in Z and R.

While X can be any acid radical that will combine with mercury, it is preferable that those materials should be used which will not affect adversely the water solubility or the fungicidal properties of the compound. The effectiveness of the phenyl mercuric compounds as toxic agents is dependent on the concentration of the phenyl mercuric ion. Therefore, it is preferred to have an acid radical which will permit a very high degree of dissociation. The acid radical may be formate, acetate, propionate, butyrate, methanesulfonate, ethanesulfonate, propanesulfonate, butanesulfonate, nitrate, sulfate, phosphate, chloride, fluoride, borate, or benzoate. It is preferred to use nitrate, borate or acetate because these salts are the better bactericides and fungicides, in many instances.

The presence of an alkyl substituent on the aromatic nucleus is advantageous since these have better wetting power than the unsubstituted compounds. Some improvement in wetting power goes along with increase in the size of the alkyl group, so that a four carbon group is better in wetting power than a two carbon atom group. This characteristic applies to the naphthalene derivatives as well as the benzene derivatives. Wetting and penetrating powers decrease as the carbon atoms in the alkyl group increase from 12 to 18; however, detergency powers increase with this increase in chain length. Thus, the number of carbon atoms in the aliphatic group R will depend on the particular use of my compound. Where wetting and penetrating are very important, for example, in treating lumber or logs to prevent sap stain, R is preferably an alkyl group of about 1 to about 4 carbon atoms, and preferably attached to a naphthalene nucleus. Where detergency and ability to suspend fine particles in the water are important, R is preferably an alkyl group of about 12 to 18 carbon atoms.

It is indicated that when R is a hydrogen atom and X is an organic acid radical of 4 or less carbon atoms or an inorganic acid radical, the phenyl mercuric salt can be rendered of satisfactory water solubility, i. e. at least about 20% by weight, by the introduction of about 4 oxyethylene groups to the phenolic group, i. e. $O-(C_2H_4O)_4-H$, and complete miscibility can be attained by adding more oxyethylene groups. It appears that one oxyethylene group can solubilize about two carbon atoms in an alkyl substituent. Thus, when R represents a $CH_3$ group, A should be a polyoxyethylene ether chain containing at least 5 oxyethylene groups and preferably 6 or more. Even though it is not necessary to balance the solubility of the molecule exactly as the number of carbon atoms in the alkyl group increases, the desired minimum water solubility places a limit on the number of carbon atoms in the alkyl group for a given number of oxyethylene groups. This limit on the number of carbon atoms in the alkyl group is about 4 carbon atoms in excess of the theoretical number that the polyoxyethylene ether chain can solubilize completely. When the aromatic nucleus is naphthalene, two additional oxyethylene groups are needed above the number calculated for the corresponding benzene nucleus. Thus, when R is a hydrogen and X is an organic acid radical of 4 or less carbon atoms or an inorganic acid radical, A should be at least equal to 4 oxyethylene groups for a benzene nucleus and 6 for a naphthalene nucleus. When R is an alkyl hydrocarbon side chain of $n$ carbon atoms, the number of oxyethylene groups in A should be at least, for a benzene nucleus, $4+0.5(n-4)$, or for a naphthalene nucleus, at least $6+0.5(n-4)$, where $n$ in each formula is at least 4.

Propylene oxide has about one-half the water-solubility enhancement power of ethylene oxide. Thus, when R contains $n$ carbon atoms, the number of oxy-propylene groups in A should be at least, for a benzene nucleus, $n+4$ or for a naphthalene nucleus, $n+8$.

Although I have shown a mathematical formula for determining the variation of the minimum number of oxy-alkylene groups with the number of carbon atoms in the aromatic nucleus and the aliphatic substituent, it must be understood that this relationship is empirical rather than absolute. The solubility of this class of compounds is in part determined by the spatial arrangement of the aliphatic side chain, the polyoxyalkylene ether chain, and the mercuric derivative about the aromatic nucleus. Thus, isomers may require more oxy-alkylene groups or fewer oxy-alkylene groups than the above formula would call for.

Addition of oxy-alkylene groups above the number required to obtain complete miscibility with water has no harmful effect up to about 30 oxy-alkylene groups. Compounds containing about 30 or more oxy-alkylene groups are waxy solids. Since a liquid fungicide is preferred, I limit the number of oxy-alkylene groups to less than about 25. Some examples of the class of compound coming within the scope of my invention are: mercuriacetate derivative of heptaoxyethylene ether of cresol, mercuriborate derivative of heptaoxyethylene ether of octylphenol, mercuriacetate derivative of hexaoxyethylene ether of hexylphenol, mercurinitrate derivative of heptaoxyethylene ether of octylphenol, mercurichloride derivative of heptaoxyethylene ether of methylnaphthol, mercurinitrate derivative of dodecyloxyethylene ether of hexadecylnaphthol, mercuriacetate derivative of decyloxypropylene ether of cresol, mercurichloride derivative of hexadecyloxypropylene ether of octylnaphthol and mercurinitrate derivative of octyloxyethylene ether of octylnaphthol.

The following examples illustrate the preparation of several species of my novel class of compounds.

*Example I*

Equimolar quantities of mercuric acetate and a heptaoxyethylene ether of o-cresol were heated to about 100° C. while undergoing agitation. A cloudy, viscous liquid was obtained. A clear viscous, light-amber colored liquid product was obtained by filtration of the reaction mixture. The product was analyzed for mercury by the thiocyanate titration method. The analysis showed 35.0% mercury whereas the theoretical amount is 30.0%. This compond is:

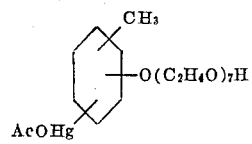

The product liquid is completely soluble in water, alcohol, chloroform and benzene; it is insoluble in hexane. Tests for foaming and surface activity show no appreciable difference from the parent material.

The organism causing peach brown rot, *Sclerotinia fructicola* (Wint.) Rehm, was used for testing the fungicidal activity of my compounds, because it is easily grown in the laboratory and the final germination is easy to observe. The fungicidal activity was determined according to the test procedure approved by the American Phytopathological Society Committee on Standardization of Fungicidal Tests. The test has been entitled, "Test Tube Dilution Technique for Use With the Slide Germination Method of Evaluating Protectant Fungicides," and is described in Phytopathology, vol. 37, No. 5 (May 1947), pp. 354-356. This particular compound was tested at dilutions of 1, 2, 3, 4, and 5 milligrams per liter of water. The lethal dosage values derived from the test were:

| | mg./l. |
|---|---|
| LD-5 | 1.6 |
| LD-50 | 2.5 |
| LD-95 | 3.8 |

In view of the fact that any fungicide with a LD-50 rating of less than 25.0 mg./l. is considered to be very effective, the superior fungicidal activity of my compound is self-evident.

*Example II*

Mercuric acetate, 6.3 gms., and 10.2 gms. of the hexoxyethylene ether of hexylphenol were heated while undergoing agitation, to about 130° C. for about 10 minutes. The mixture was cooled to about 25° C. and filtered; 0.4 gm. of unreacted mercuric acetate were recovered. The filtered product was diluted with ethyl ether and filtered again. The ethyl ether was stripped from the filtrate; 12.5 gms. of a clear, viscous oily material was recovered. The mercury content of the product was 23.3 weight per cent whereas the theoretical for the formula shown below is 25.8 weight per cent. The product is very soluble in water and has about the same color and wetting properties as the parent material. The product is:

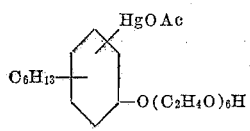

*Example III*

Mercuric acetate, 24 gms. and 40 gms. of a technical grade heptaoxyethylene ether of octylphenol were heated to about 100° C., whereupon the contents of the flask changed from a tan to a brick red color. At a temperature of 120° C., the color changed to water white. The reactants were agitated for about 15 minutes at 130° C. A water white product was obtained which contained 21.5 weight per cent of mercury. The theoretical mercury content for the product shown below is 25.8. The product had about the same wetting and detergency powers and high water solubility as the parent material. The product is:

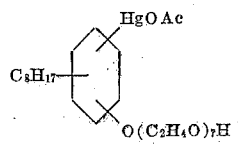

*Example IV*

Mercuric acetate, 31 gms. and 50 gms. of technical grade hexaoxyethylene ether of undecylphenol were heated to about 100° C., whereupon the contents of the flask changed from water-white to orange color. At a temperature of 120° C., the color changed to water-white. The reactants were agitated for about 20 minutes at 130° C. A water-white product was obtained which contained 26.0 weight per cent mercury. The theoretical mercury content of the product shown below is 25.8 weight per cent. The product is about 30 weight per cent soluble in water at 25° C. The product possesses the wetting and detergency powers of the parent detergent. The product is:

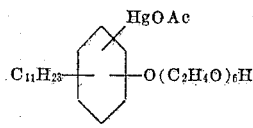

*Example V*

Mercuric acetate, 27 gms. and 50 gms. of decaoxyethylene ether of cresol were heated to about 130° C. and agitated at that temperature for about 20 minutes. A clear product was obtained which contained 24.0 weight per cent mercury. The theoretical mercury content is 24.7 weight per cent. The product had the same very high solubility as the parent material. The wetting and detergency of the product and the parent material were very similar. The product is:

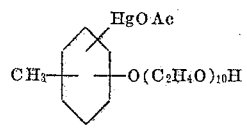

*Example VI*

Beta naphthol (0.10 mol) and 1.5 gms. of sodium methoxide catalyst were heated to 120° C. in an autoclave. Over a period of 15 minutes, 1.0 mol of ethylene oxide was added to the autoclave. Stirring was continued for another 45 minutes to insure complete reaction. The product was very water-soluble and had marked surface-active properties. Mercuric acetate (0.03 mol) and 0.03 mol of the product, obtained above, were heated to 130° C. and agitated at this temperature for about 20 minutes. The product of this reaction was more than 30 weight per cent soluble in water and had marked surface active properties. The product contained 17.2 weight per cent mercury; the theoretical mercury content for the formula shown below is 24%. The theoretical formula for this compound is:

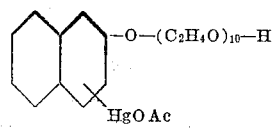

While I have described the preparation of my new class of compounds by the direct reaction of a mercury salt with polyoxyethylene ether derivatives of alkyl phenols, I am not limited to this method of preparation. Other methods of preparing these compounds will be apparent to those skilled in the art.

I have prepared and examined the mercuric salts of oxyalkylene ethers of thiophenols and have found them to be effective fungicides and bactericides. However, these mercuric salts are very much less soluble in water than the corresponding derivatives of phenolic compounds; in fact most of these derivatives of thiophenolic compounds are only slightly soluble in water. The water solubilizing effect of the alkylene oxide on the thiophenolic mercury compound is very much less than that described above for the phenolic mercury compounds.

A serious problem in the manufacture of paper is the formation of slime in the water which formation causes a sharp degradation of the quality of the finished paper. This slime is a mixture of fungi, algae and bacterial growth. The addition of 1 part of a phenyl mercuric salt to 1,000–50,000 parts of water in the system inhibits the growth of the plant and animal life and prevents spoilage. The penetrating qualities of my compounds are of great help to protecting the felt covered rolls used in certain steps in the paper manufacturing process. Detergents are used in the water to increase penetration of the fungicide and help in the manufacturing operation. My fungicidal compound when used in amounts of the order of one part of fungicide to between 1,000–50,000 parts of water in the system will permit easy solution of the fungicide in the water, eliminate the poisonous dust hazard and eliminate the need for most, if not all, the detergent.

The tanning of leather requires extended standing of the skins and hides in water under conditions ideally suited for fungus and bacterial activity. The wet leather often becomes moldy during the drying operation. For best results, the fungicide should penetrate deeply into the leather; the wetting powers of my water-soluble fungicide are ideally suited for this use.

In the lumber industry the control of sap stain due to blue mold attack is a serious problem; the deeply penetrating fungicide of the present invention will work very well in this field.

Phenyl mercuric acetate has been used to control the growth of certain types of crabgrass. Even with wetting agents added to the water solution of the phenyl mercuric acetate, the penetration into the grass is so slight that poor results are obtained, even with heavy dosages of the chemical. My compound with its self-contained wetting and toxic activity will work very well against those crabgrasses susceptible to attack by mercury compounds. Its liquid state and high water solubility makes for very easy preparation of the water solutions used against crab grass.

The above listed uses are not exhaustive and it is to be understood that my class of compounds can be used in any of the applications of the phenyl mercuric salt fungicides and bactericides.

I claim:

1. As a new composition of matter a liquid water-soluble aryl mercuric salt having the general formula

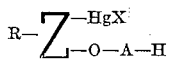

where Z is an aromatic nucleus selected from the class consisting of benzene and naphthalene, X is an acid radical, R is a nuclear substituent selected from the class consisting of hydrogen and an aliphatic radical having from 1 to 18 carbon atoms, and A is a polyoxyalkylene ether chain containing oxy-alkylene groups selected from the class consisting of oxy-ethylene and oxy-propylene.

2. An aryl mercuric salt having the general formula

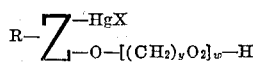

wherein Z is an aromatic nucleus selected from the class consisting of benzene and naphthalene, X is an acid radical, R is a nuclear substituent selected from the class consisting of hydrogen and an aliphatic radical having from 1 to 18 carbon atoms, $y$ and $w$ are integers, $y$ being 2 to 3 inclusive and $w$ being from about 4 to about 25, and the relation between $w$ and the number of carbon atoms in R and Z being such that the aryl mercuric salt is a liquid having at least about 20 weight per cent solubility in water.

3. A liquid, water-soluble fungicidal composition containing as the active ingredient an aryl mercuric salt having the general formula

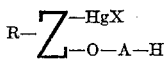

wherein Z is an aromatic nucleus selected from the class consisting of benzene and naphthalene, X is an acid radical, R is a nuclear substituent selected from the class consisting of hydrogen and an aliphatic radical having from 1 to 18 carbon atoms, and A is a polyoxyalkylene ether chain containing from about 4 to about 25 oxyalkylene groups selected from the class consisting of oxyethylene and oxypropylene.

4. The fungicidal composition of claim 3 wherein Z is a benzene nucleus and A is a polyoxyethylene ether chain of from about 4 to about 25 oxyethylene groups.

5. As a new composition of matter a phenyl mercuric salt having the formula

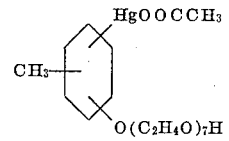

6. As a new composition of matter a phenyl mercuric salt having the formula

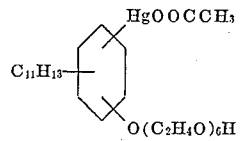

7. A fungicidal composition containing as the active ingredient a phenyl mercuric salt having the formula:

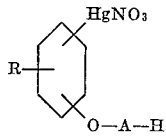

wherein R is a nuclear substituent selected from the class consisting of hydrogen and an aliphatic radical containing from 1 to 18 carbon atoms and A is a polyoxyethylene ether chain of from about 4 to about 25 oxyethylene groups.

8. A fungicidal composition containing as the active ingredient a naphthyl mercuric salt having the formula:

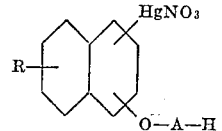

wherein R is a nuclear substituent selected from the class consisting of hydrogen and an aliphatic radical containing from 1 to 18 carbon atoms and A is a polyoxyethylene ether chain of from about 4 to about 25 oxyethylene groups.

9. A method for inhibiting fungal and bacterial activity on organic material that is subject to such attack, wherein said material is treated with an aqueous solution containing in excess of 2 parts per million of the composition of claim 1.

10. A method of inhibiting fungal and bacterial activity on organic matter that is subject to such attack, wherein said material is treated with an aqueous solution containing in excess of 2 parts per million of a phenyl mercuric salt having the formula:

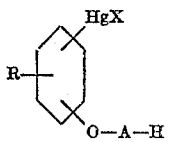

wherein R is a nuclear substituent selected from the class consisting of hydrogen and an aliphatic radical containing from 1 to 18 carbon atoms, X is an acid radical, and A is a polyoxyethylene ether chain of from about 4 to about 25 oxyethylene groups.

11. A method for inhibiting fungal and bacterial activity on organic material that is subject to such attack, wherein said material is treated with an aqueous solution containing in excess of 2 parts per million of the composition of claim 7.

ROBERT A. DINERSTEIN.

References Cited in the file of this patent

UNITED STATES PATENTS

| Number | Name | Date |
|---|---|---|
| 1,970,578 | Schoeller et al. | Aug. 21, 1934 |
| 2,496,582 | Enyeart | Feb. 7, 1950 |

OTHER REFERENCES

Whitmore, "Organic Compounds of Mercury," pages 261–262, 277.